United States Patent
Goolsby

(10) Patent No.: US 7,492,780 B1
(45) Date of Patent: Feb. 17, 2009

(54) METHOD AND APPARATUS FOR DETECTING TIMEOUT FOR PACKETS TRANSMITTED IN A PACKET-SWITCHED POINT-TO-POINT COMMUNICATION ARCHITECTURE

(75) Inventor: Jeremy B. Goolsby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 722 days.

(21) Appl. No.: 11/066,684

(22) Filed: Feb. 25, 2005

(51) Int. Cl.
*H04L 12/28* (2006.01)

(52) U.S. Cl. ...................................... 370/412; 370/429

(58) Field of Classification Search ............ 370/395.71, 370/412, 413, 368, 428, 429, 293, 229
See application file for complete search history.

(56) References Cited

U.S. PATENT DOCUMENTS

| | | | |
|---|---|---|---|
| 6,295,281 B1 * | 9/2001 | Itkowsky et al. | 370/293 |
| 6,434,642 B1 * | 8/2002 | Camilleri et al. | 710/57 |
| 7,307,951 B2 * | 12/2007 | Dittmann et al. | 370/230 |

OTHER PUBLICATIONS

U.S. Appl. No. 11/040,399, filed Jan. 21, 2005, Goolsby.

D. Phil Burton et al.; "Session XI: Data Acquisition Components; Tham 11.4: An 8-Channel Data Acquisition System with DMA"; ISSCC 80; Feb. 14, 1980; 1980 IEEE International Solid-State Circuits Conference; pp. 136-137.

Milan Prokin; "Speed Measurement Using the Improved DMA Transfer Method"; 1991 IEEE; IEEE Transactions on Industrial Electronics; vol. 38, No. 6; Dec. 1991; pp. 476-483.

Devavrat Shah et al.; "Maintaining Statistics Counters in Router Line Cards"; 2002 IEEE; Jan.-Feb. 2002; pp. 76-81.

RapidIO Trade Association, "The RapidIO Interconnect Specification," Jun. 26, 2002, pp. 1-255, Rev. 1.2, available from the RapidIO Trade Association, 3925 W, Baker Lane, Suite 325, Austin, TX 78759, USA.

* cited by examiner

*Primary Examiner*—Chirag G Shah
*Assistant Examiner*—Nina Mahmoudzadeh
(74) *Attorney, Agent, or Firm*—Robert M. Brush

(57) ABSTRACT

Method and apparatus for detecting timeout for packets transmitted in a packet-switched point-to-point communication system is described. In one example, timeout logic in a transmitter includes a master time counter, a first-in-first-out circuit (FIFO), difference logic, a timeout counter, and timeout detection logic. The master time counter generates a time signal, and the FIFO stores time stamps for the packets in response to the time signal. The FIFO provides a time stamp to the difference logic in response to a packet acknowledgement. The difference logic computes a time left value in response to the time stamp, the time signal, and a predefined timeout value. The timeout counter counts down from the time left value towards a zero value. The timeout detection logic produces a timeout signal in response to the timeout counter reaching the zero value.

10 Claims, 5 Drawing Sheets

METHOD AND APPARATUS FOR DETECTING TIMEOUT FOR PACKETS TRANSMITTED IN A PACKET-SWITCHED POINT-TO-POINT COMMUNICATION ARCHITECTURE

FIELD OF THE INVENTION

One or more aspects of the present invention relate generally to digital logic circuits and, more particularly, to a method and apparatus for detecting timeout for packets transmitted in a packet-switched point-to-point communication system.

BACKGROUND OF THE INVENTION

Communication between electronic devices is drawing more attention as the speeds of such electronic devices increase. One type of electronic communications architecture for interconnecting electronic devices is the RAPIDIO standard, described in "The RapidIO™ Interconnect Specification," Revision 1.2, June, 2002, published by the RapidIO Trade Association. The RAPIDIO architecture is configured for interconnecting microprocessors, digital signal processors (DSPs), communications and network processors, system memory, peripheral devices, and the like on a circuit board or several circuit boards using a backplane. The RAPIDIO architecture provides for packet-switched point-to-point technology for passing data and control information within embedded systems, primarily used in network and communications equipment.

In a RAPIDIO system, two ports are interconnected via a link. Each port has a transmitter and a receiver connected to the other port's receiver and transmitter, respectively. In the serial mode, a full duplex serial interface between endpoint devices is provided using unidirectional differential signals in each direction. A RAPIDIO system may be implemented within an integrated circuit, such as a programmable logic device.

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBS) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

In the RAPIDIO standard, an endpoint device must perform a recovery process if a given transmitted packet has not been acknowledged after approximately three seconds ("expiration period"). In the serial mode, an endpoint device can have up to 32 outstanding packets at any given moment. If a given packet has been unacknowledged past the expiration period, the packet has expired and the recovery process is triggered. In the recovery process, the endpoint device resends the expired packet and all packets that have been sent after the expired packet. As the recovery process begins, all timers for outstanding packets are cleared, even if they have not expired (i.e., an expiration of one packet is treated as an expiration of all unacknowledged packets).

Conventionally, an endpoint device configured for serial RAPIDIO communication employs 32 large counters (i.e., a counter for each possible outstanding packet). If the endpoint device is implemented with an FPGA, such an architecture consumes a significant amount of programmable resources. Specifically, for an FPGA running at 156.25 MHz, the counters require 29 bits (i.e., $2^{29}$ cycles/156,250,000 cycles/sec is approximately equal to 3.4 seconds). A register implementation of the counters would require 928 registers (i.e., 29 times 32) and 32 carry chains.

Accordingly, there exists a need in the art for a method and apparatus that detects timeout for packets transmitted in a packet-switched point-to-point communication architecture employing minimal logic resources.

SUMMARY OF THE INVENTION

Method and apparatus for detecting timeout for packets transmitted in a packet-switched point-to-point communication system is described. In one embodiment, timeout logic in a transmitter includes a master time counter, a first-in-first-out circuit (FIFO), difference logic, a timeout counter, and timeout detection logic. The FIFO includes a data input terminal in communication with the master time counter and a data output terminal. The difference logic is in communication with the data output terminal and the master time counter. The timeout counter is in communication with the difference logic. The timeout detection logic is in communication with the timeout counter. The master time counter is configured to generate a time signal, and the FIFO is configured to store time stamps for the packets in response to the time signal. The FIFO is configured to provide a time stamp to the difference logic in response to a packet acknowledgement. The difference logic is configured to compute a time left value in response to the time stamp, the time signal, and a predefined timeout value. The timeout counter is configured to count down from the time left value towards a zero value. The timeout detection logic is configured to produce a timeout signal in response to the timeout counter reaching the zero value.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
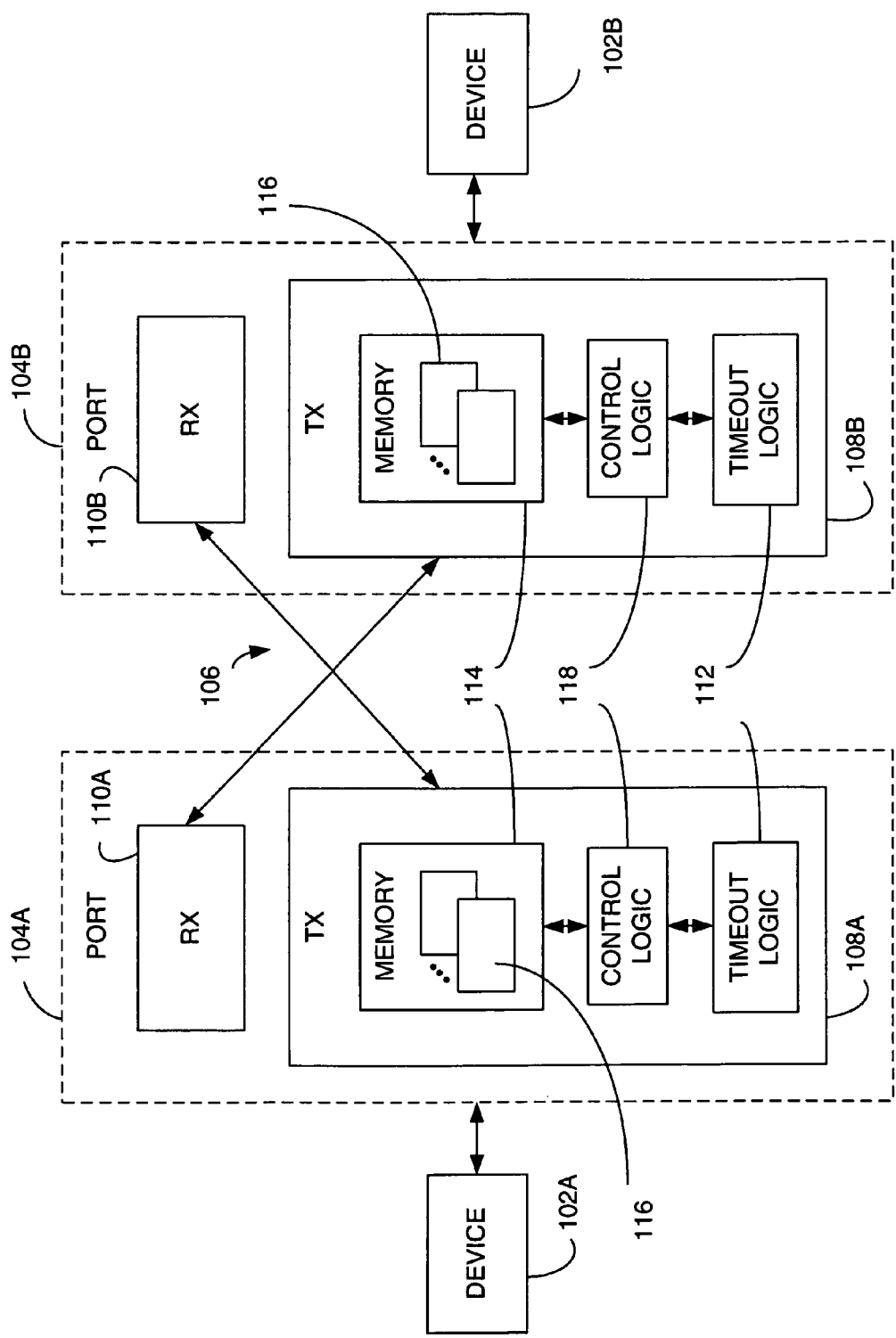
FIG. 1 is a block diagram depicting an exemplary system for communication between electronic devices in which timeout logic of the invention may be employed.

FIG. 1 is a block diagram depicting an exemplary system 100 for communication between electronic devices in which the invention may be employed. The system 100 includes a device 102A in communication with a port 104A, and a second device 102B in communication with a port 104B. The device 102A transmits and receives data from the device 102B over a link 106 using the port 104A. The device 102B transmits and receives data from the device 102A over the link 106 using the port 104B. The port 104A includes a transmitter 108A and a receiver 110A, and the port 104B includes a transmitter 108B and a receiver 110B. The transmitter 108A is in communication with the receiver 110B, and the receiver 110A is in communication with the transmitter 108B.

The devices 102A and 102B communicate data and control information with one another through the ports 104A and 104B using a serial packet-switched point-to-point communication architecture, such as the RAPIDIO electronic communication architecture. Each of the transmitters 108A and 108B includes a memory 114 having a set of buffers 116 for storing packets to be transmitted, timeout logic 112 for detecting packet timeouts, and control logic 118 for controlling the memory 114 and the timeout logic 112.

In operation, each of the transmitters 108A and 108B transmit packets to their respective receivers 110B and 110A from the buffers 116. The receivers 110A and 110B send acknowledgement signals to their respective transmitters 108B and 108A in response to receiving packets. In each of the transmitters 108A and 108B, if a given packet has been unacknowledged beyond a predefined expiration period (e.g., approximately 3 seconds in RAPIDIO), the timeout logic 112 sends a timeout signal to the control logic 118. In response, the control logic 118 implements a recovery process. Notably, in the recovery process, the expired packet and each packet sent after the expired packet are resent.

Figure 2:
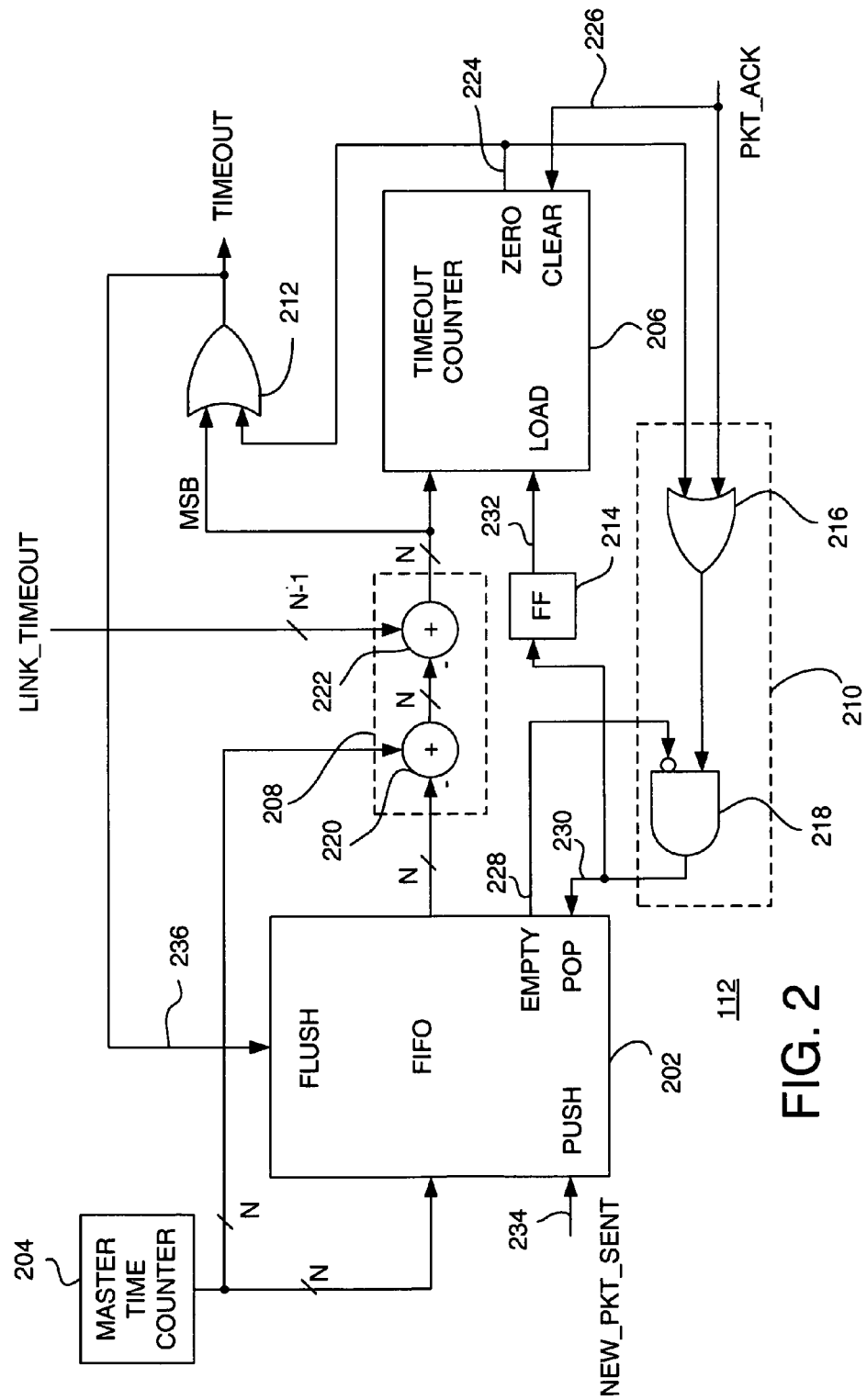
FIG. 2 is a block diagram depicting an exemplary embodiment of the timeout logic shown in FIG. 1 constructed in accordance with the invention.

FIG. 2 is a block diagram depicting an exemplary embodiment of the timeout logic 112 shown in FIG. 1 constructed in accordance with the invention. The timeout logic 112 includes a first-in-first-out circuit (FIFO) 202, difference logic 208, timeout counter 206, master time counter 204, timeout detector 212, combinatorial logic 210, and a flip-flop (FF) 214. In one embodiment, the difference logic 208 comprises a subtractor 220 and a subtractor 222; the combinatorial logic 210 comprises an AND gate 218 and an OR gate 216; and the timeout detector 212 comprises an OR gate 212. The FIFO 202 may be implemented using a read/write memory circuit, such as random access memory (RAM). For purposes of clarity, clock signals for the synchronous circuitry in FIG. 2 (i.e., FIFO 202, timeout counter 206, master time counter 204, flip-flop 214) have been omitted.

An output terminal of the master time counter 204 is coupled to a data input terminal of the FIFO 202, as well as a first input terminal of the subtractor 220. The output terminal of the master time counter 204 provides an N-bit signal, where N is a positive integer. In one embodiment, the master time counter 204 is a free-running N-bit counter.

A data output terminal of the FIFO 202 is coupled to a second input terminal of the subtractor 220. The subtractor 220 subtracts the output signal of the FIFO 202 from the output signal of the master time counter 204. A first input terminal of the subtractor 222 is coupled to an output terminal of the subtractor 220. A second input terminal of the subtractor 222 is configured to receive a signal indicative of a link timeout period (link_timeout). The link timeout period is a predefined expiration period for unacknowledged packets. The subtractor 222 subtracts the output signal of the subtractor 220 from the link_timeout signal.

A data input terminal of the timeout counter 206 is coupled to the output terminal of the subtractor 222. A zero terminal 224 of the timeout counter 206 is coupled to a first input terminal of the OR gate 212, as well as a first input terminal of the OR gate 216. The zero terminal 224 provides a logic high signal if the timeout counter reaches zero, and a logic low signal otherwise. A second input terminal of the OR gate 212 is configured to receive the most significant bit (MSB) of the output signal provided by the subtractor 222. An output terminal of the OR gate 212 provides a signal indicative of a timeout condition (timeout). The OR gate 212 provides a logic high signal if a timeout condition has been detected, and a logic low signal otherwise. The output terminal of the OR gate 212 is coupled to a flush terminal 236 of the FIFO 202. When a signal is asserted at the flush terminal 236, the FIFO 202 is cleared of all data.

A clear terminal 226 of the timeout counter 206 is configured to receive a signal indicative of a packet acknowledgement (pkt_ack). Applying a logic high signal to the clear terminal 226 clears the timeout counter 206; the timeout counter 206 continues to count otherwise. A second input terminal of the OR gate 216 is configured to receive the pck_ack signal. An output terminal of the OR gate 216 is coupled to a first input terminal of the AND gate 218. A second input terminal of the AND gate 218 is configured to receive a logically inverted version of a signal from an empty terminal 228 of the FIFO 202. The empty terminal 228 is configured to provide a logic high signal if the FIFO 202 is empty, and a logic low signal otherwise.

An output terminal of the AND gate 218 is coupled to a pop terminal 230 of the FIFO 202, as well as an input terminal of the flip-flop 214. If a logic high signal is applied to the pop terminal 230, the FIFO 202 outputs data via the data output terminal (i.e., data is popped from the FIFO 202). An output terminal of the flip-flop 214 is coupled to a load terminal 232 of the timeout counter 206. If a logic high signal is applied to the load terminal 232, the timeout counter 206 loads data at the data input terminal. A push terminal 234 of the FIFO 202 is configured to receive a signal indicative of a new packet being sent (new_packet_sent). If a logic high signal is applied to the push terminal 234, the FIFO 202 loads data at the data input terminal (i.e., data is pushed into the FIFO 202).

In operation, as each packet is transmitted, a time stamp for that packet is pushed into the FIFO 202 by asserting the new_packet_sent signal applied to the push terminal 234. The time stamp is obtained from the master time counter 204. Once the FIFO 202 stores at least one time stamp, whenever the timeout counter 206 maintains a zero value (a signal is asserted on the zero terminal 224) or a packet is acknowledged (the pck_ack signal is asserted), a time stamp is popped from the FIFO 202. In particular, if the FIFO 202 is not empty, the AND gate 218 will pass the output signal of the OR gate 216. The OR gate 216 provides an asserted signal whenever the timeout counter 206 maintains a zero value or a packet is acknowledged. By receiving an asserted signal at the pop terminal 230, a time stamp is popped from the FIFO 202. The push interface and the pop interface of the FIFO 202 operate independently of one another.

The subtractor 220 subtracts a time stamp popped from the FIFO 202 from a current time output by the master time counter 204 to provide an elapsed time since the packet associated with the popped time stamp was sent. The subtractor 222 subtracts the elapsed time from the link_timeout value to provide the time left before expiration. In particular, the difference logic 208 implements the following equation (referred to as Equation 1):

$$\text{time\_left} = \text{link\_timeout} - (\text{current\_time} - \text{time\_stamp}),$$

where current_time is the current time output by the master time counter 204, time_stamp is the popped time stamp from the FIFO 202, link_timeout is the link timeout value, and time_left is the time left before expiration of the packet associated with the popped time stamp.

The time_left value produced by the difference logic 208 is loaded into the timeout counter 206. In particular, the load terminal 232 is asserted one clock cycle after the time stamp has been popped from the FIFO 202 through the flip-flop 214. If a packet acknowledgement is received for the packet associated with the popped time stamp, then the timeout counter 206 is cleared (the clear terminal 226 is asserted by the pck_ack signal) and the next time stamp is popped from the FIFO 202. If the timeout counter 206 counts down to zero, then the packet associated with the popped time stamp has expired and the timeout signal is asserted. In particular, when the timeout counter 206 reaches zero, a signal is asserted at the zero terminal 224, which causes the OR gate 212 to assert its output signal. When the timeout signal is asserted, the FIFO 202 is cleared of all time stamps (i.e., a signal is asserted at the flush terminal 236). The timeout signal causes the control logic 118 (FIG. 1) to initiate the recovery process.

Notably, in some cases, packets may be transmitted in rapid succession. It is thus possible that the packet acknowledgements for the packets will be received over a larger time interval. As such, if two packets are sent close together in time, and the first packet's acknowledge is received just before it expires, the initial counter value in the time counter 206 for the second packet will be short. Since two clock cycles are consumed in reading the FIFO 202 and loading the timeout counter 206, it is possible that an underflow condition will occur in the calculation of the time left for the current packet.

This problem is addressed using the MSB of the values produced by the master time counter 204. For example, suppose the master time counter 204 produced 29-bit time stamps and the link_timeout value included 29 bits. Suppose the master time counter generates a time stamp value of 0x0000_0000 when packet X is sent. Also suppose that another packet X+1 is sent immediately after packet X and its time stamp is 0x0000_0001. If the link_timeout value is at its maximum, and packet X is acknowledged just in time (e.g., current_time is 0x1FFF_FFFF), then by the time the timeout counter 206 is loaded for packet X+1 (e.g., 2 cycles later), the loaded value would be (Equation 1):

$$0x1FFF\_FFFF - (0x0000\_0001 - 0x0000\_0001) = 0x1FFF\_FFFF$$

In other words, the calculation will underflow and the second packet X+1 will be given extra time it is not supposed to have. If the master time counter 204 produces 30-bit time stamps and the link_timeout value is 29 bits, then the above result would be 0x3FFF_FFFF. The 30th bit (MSB) may be used to detect an underflow. If the MSB is set, the next packet is deemed to have expired.

Thus, the master time counter 204 produces N-bit time stamps, and the link_timeout value includes N-1 bits. The MSB of the values produced by the difference logic 208 is coupled to the OR gate 212. If the MSB is asserted, the OR gate 212 will assert the timeout signal.

Operation of the timeout logic 112 may be further understood with reference to the following example. Suppose that after resetting the device, the following happens:
  1) link_timeout=0x0001_0000;
  2) packet A is sent with current_time=0x2AAA_AAAA;
  3) packet B is sent with current_time=0x2AAA_BBBB;
  4) ack for packet A is received at current_time=0x2AAA_CCCC; and
  5) ack for packet B is received at current_time=0x2AAB_CCCC.

The consequences would be the following. The FIFO 202 stores current_time 0x2AAA_AAAA as a time stamp for packet A. Since the device has just been reset, the timeout counter 206 is empty and the time stamp is read from the FIFO 202 two clock cycles after being loaded (current_time is 0x2AAA_AAAC). The difference logic 208 produces the time_left value as (Equation 1):

$$0x0001\_0000 - (0x2AAA\_AAAC - 0x2AAA\_AAAA) = 0x0000\_FFFE.$$

The timeout counter 206 counts downward from that value.

The FIFO 202 stores current_time 0x2AAA_BBBB as a time stamp for packet B. The acknowledgment for packet A is received at current_time 0x2AAA_CCCC. The timeout counter 206 is cleared having counted down to approximately 0x0000_DDDE. Since the timeout counter 206 did not reach zero, there is no timeout for packet A. The newest time stamp is read out of the FIFO 202 about two cycles later (current_time is 0x2AAA_CCCE). The difference logic 208 produces the time_left value as (Equation 1):

$$0x0001\_0000 - (0x2AAA\_CCCE - 0x2AAA\_BBBB) = 0x0000\_EEED.$$

The timeout counter 206 counts downward from that value.

When current_time reaches 0x2AAB_BBBB, the timeout counter 206 will have counted down to zero and there will be a timeout for packet B. The timeout causes the FIFO 202 to be flushed, the control logic 118 (FIG. 1) is informed and the recovery process is triggered. The acknowledgement for packet B is received at current_time 0x2AAB_CCCC, but it is too late and the timeout logic 112 ignores the acknowledgment.

Figure 3:
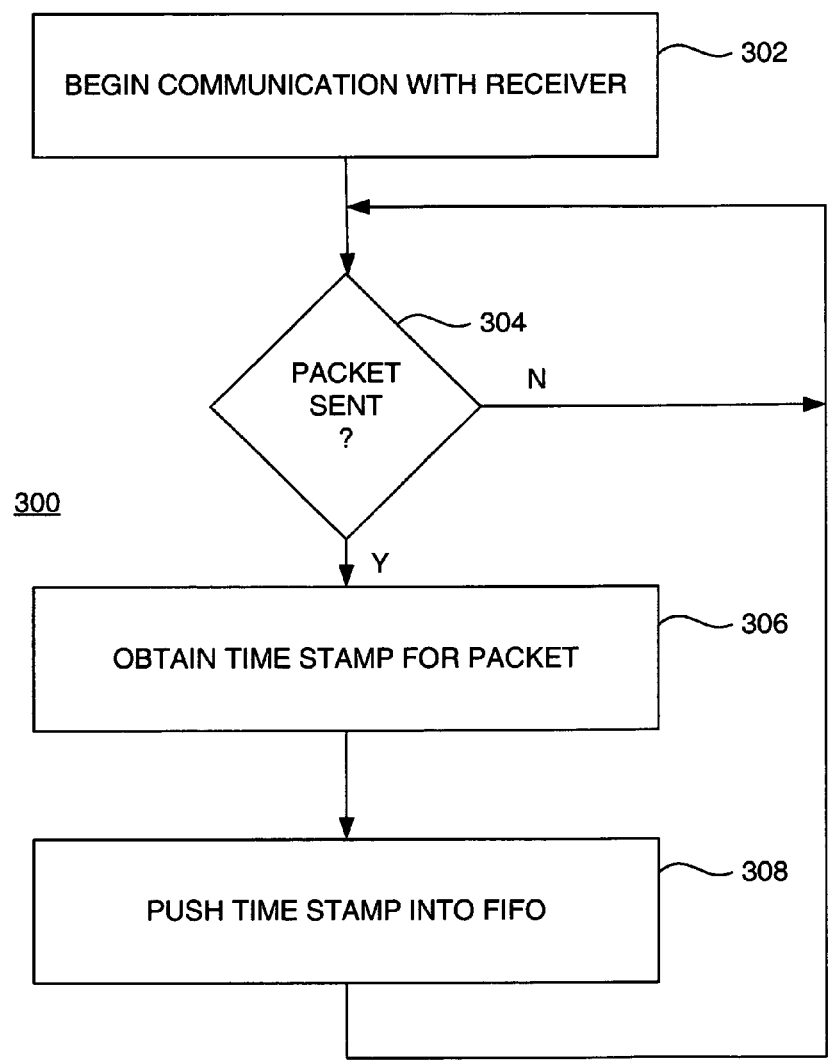
FIG. 3 is a flow diagram of a method for managing packet transmission in accordance with the invention.

FIG. 3 is a flow diagram of a method 300 for managing packet transmission in accordance with the invention. The method 300 may be used by the transmitters 108A and 108B of the system 100 in FIG. 1 during packet transmission to the receivers 110B and 110A, respectively. At step 302, communication between a transmitter and a receiver is started. At step 304, a determination is made whether a packet has been sent from the transmitter to the receiver. If not, step 304 repeats. If a packet has been sent, the method 300 proceeds from step 304 to step 306. At step 306, a time stamp is obtained for the packet. For example, the time stamp may be obtained from a free-running time counter. At step 308, the time stamp is pushed into a FIFO. The method 300 returns to step 304 and repeats.

Figure 4:
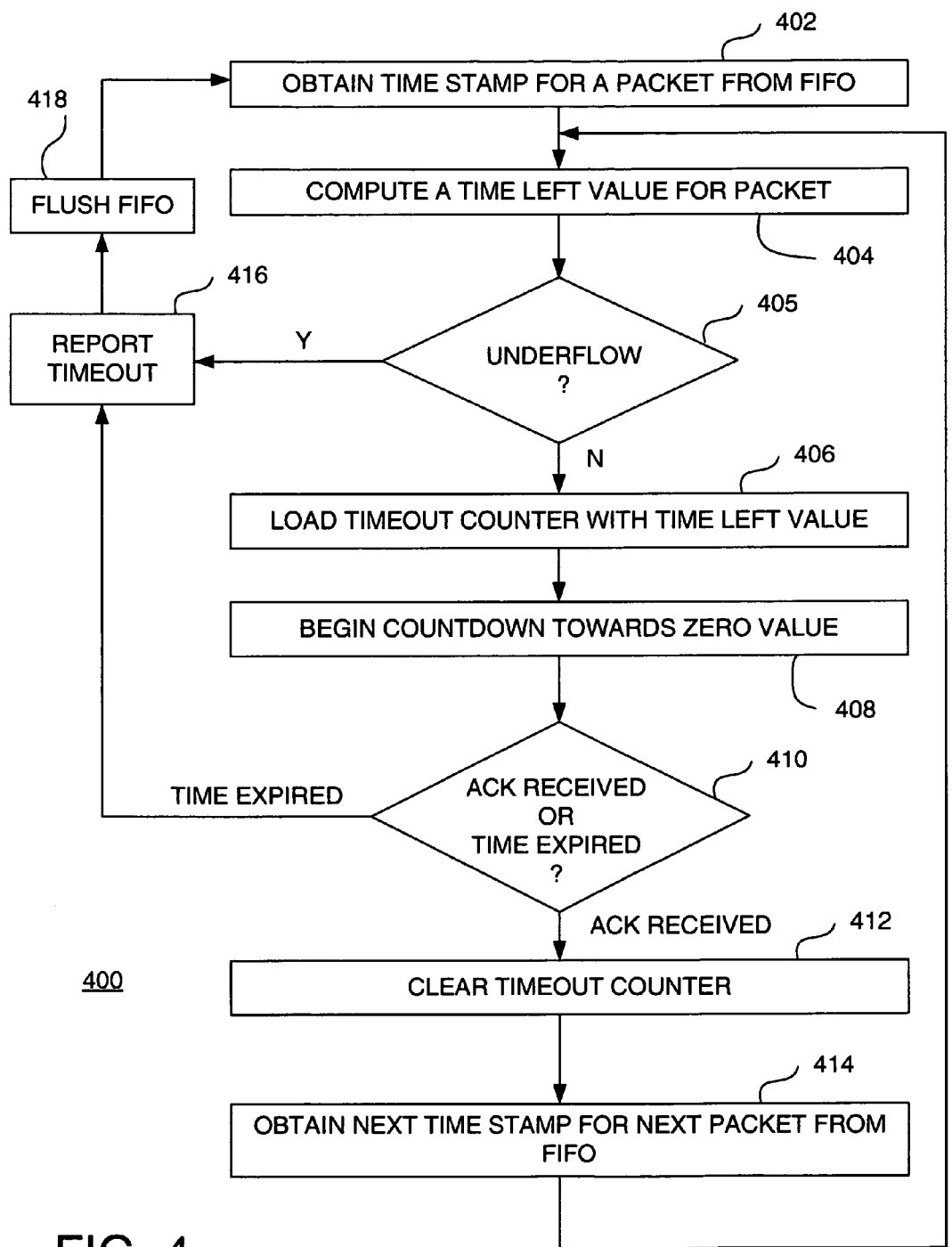
FIG. 4 is a flow diagram depicting an exemplary embodiment of a method for detecting a timeout condition during packet transmission in accordance with the invention.

FIG. 4 is a flow diagram depicting an exemplary embodiment of a method 400 for detecting a timeout condition during packet transmission in accordance with the invention. The method 400 may be used by the transmitters 108A and 108B of the system 100 in FIG. 1 to detect a timeout condition. The method 400 is performed contemporaneously with the method 300. The method 400 begins at step 402, where a time stamp is obtained for a packet from the FIFO. At step 404, a time left value is computed for the packet. The time left value may be computed by calculating the difference between the time stamp for the packet and a current time to produce an elapsed time, and by calculating the difference between a predefined timeout value and the elapsed time. This computation is shown above in Equation 1.

At step 405, a determination is made whether an underflow has occurred in the computation at step 404. If so, the method 400 proceeds to step 416. Otherwise, the method 400 proceeds to step 406. At step 406, a timeout counter is loaded with the time left value for the packet. At step 408, the timeout counter begins counting down towards a zero value from the time left value. At step 410, a determination is made as to whether an acknowledgement for the packet has been received or whether time has expired. The time is deemed expired if the timeout counter reaches the zero value before an acknowledgment is received. The step 410 is repeated until either the acknowledgement is receiver or the time is expired. If an acknowledgment is received for the packet, the method 400 proceeds to step 412.

At step 412, the timeout counter is cleared. At step 414, the next time stamp is obtained for the next packet from the FIFO. The method 400 returns to step 404 and repeats. If, at step 410, time has expired for the packet, the method 400 proceeds to step 416. At step 416, a timeout is reported. The timeout may be reported to the control logic in the transmitter to trigger the recovery process. At step 418, the FIFO is flushed and all time stamps currently stored therein are deleted. The method 400 then returns to step 402 and repeats.

Figure 5:
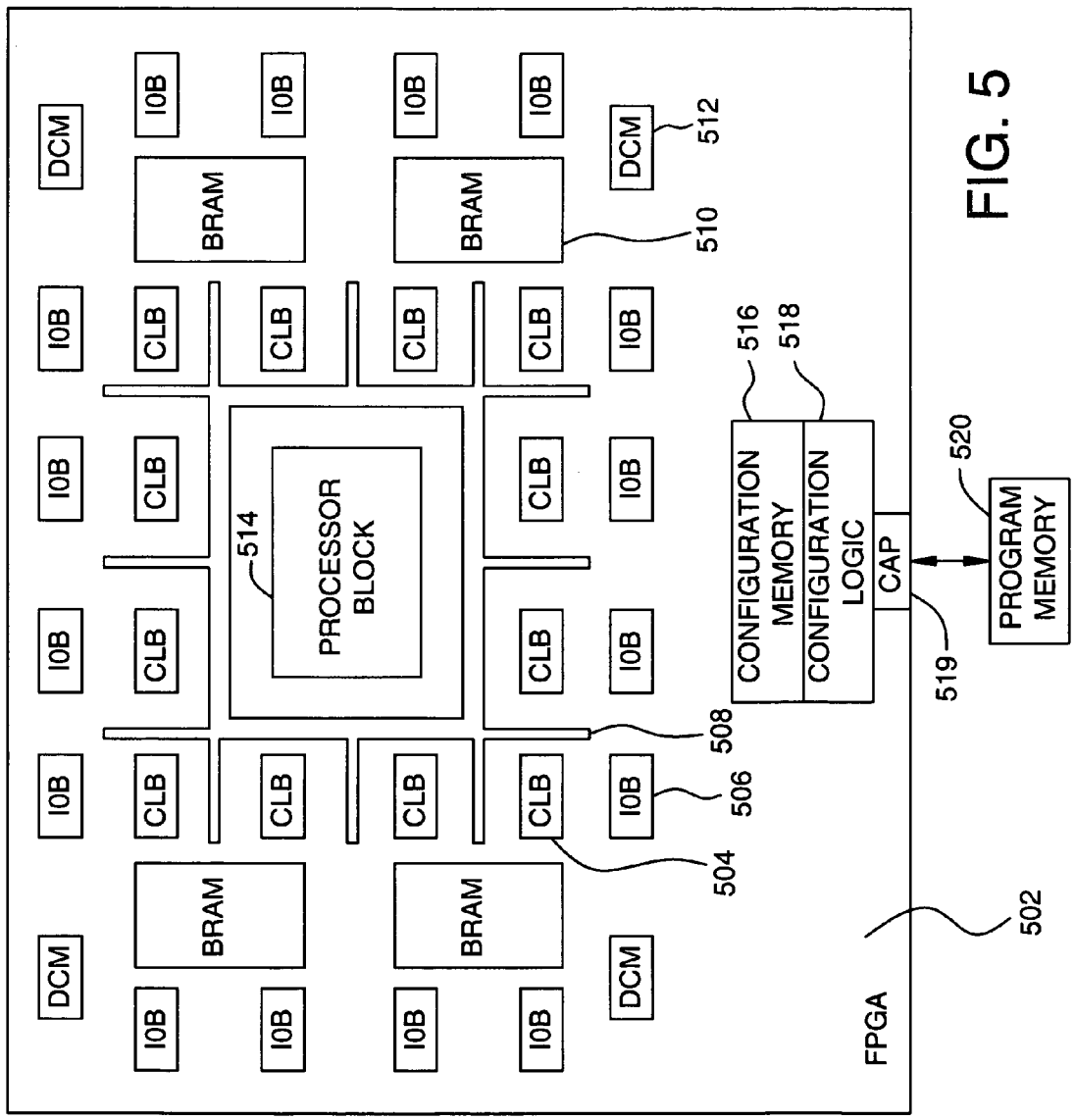
FIG. 5 is a block diagram depicting an exemplary embodiment of an FPGA in which the present invention may be implemented coupled to a program memory.

The timeout logic 112 of the invention may be implemented using a programmable logic device (PLD), such as a field programmable gate array (FPGA). In particular, FIG. 5 is a block diagram depicting an exemplary embodiment of an FPGA 502 coupled to a program memory 520. The FPGA 502 illustratively comprises programmable logic circuits or "blocks", illustratively shown as CLBs 504, IOBs 506, and programmable interconnect 508 (also referred to as "programmable logic"), as well as configuration memory 516 for determining the functionality of the FPGA 502. The FPGA 502 may also include an embedded processor block 514, as well as various dedicated internal logic circuits, illustratively shown as blocks of random access memory ("BRAM 510"), configuration logic 518, and digital clock management (DCM) blocks 512. Those skilled in the art will appreciate that the FPGA 502 may include other types of logic blocks and circuits in addition to those described herein.

As is well known in the art, the IOBs 506, the CLBs 504, and the programmable interconnect 508 may be configured to perform a variety of functions. Notably, the CLBs 504 are programmably connectable to each other, and to the IOBs 506, via the programmable interconnect 508. Each of the CLBs 504 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 506 are configured to provide input to, and receive output from, the CLBs 504.

Configuration information for the CLBs 504, the IOBs 506, and the programmable interconnect 508 is stored in the configuration memory 516. The configuration memory 516 may include static random access memory (SRAM) cells. The configuration logic 518 provides an interface to, and controls configuration of, the configuration memory 516. A configuration bitstream produced from the program memory 520 may be coupled to the configuration logic 518 through a configuration port 519. The configuration process of FPGA 502 is also well known in the art.

The DCM blocks 512 provide well-known clock management circuits for managing clock signals within the FPGA 502, such as delay lock loop (DLL) circuits and multiply/divide/de-skew clock circuits. The processor block 514 comprises a microprocessor core, as well as associated control logic. The processor block 514 is coupled to the programmable logic of the FPGA 502 in a well known manner.

For purposes of clarity by example, the FPGA 502 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 502 may be selected from the VIRTEX-4 family of products, commercially available from Xilinx, Inc. of San Jose, Calif.

Notably, referring to FIG. 2, the FIFO 202 may be implemented using BRAM 510 in the FPGA 502. By using a single BRAM to implement the timeout detection mechanism, the invention saves logic resources in the FPGA 502.

Method and apparatus for detecting timeout for packets transmitted in a packet-switched point-to-point communication system has been described. In one embodiment, timeout logic of the invention includes a FIFO for storing time stamps of transmitted packets. For each acknowledgement received, a time stamp is read out of the FIFO, the time left before expiration is loaded into a counter, and the counter beings to count down towards zero. A timeout is reported if the counter reaches zero.

The invention reduces the amount of logic necessary to manage packet timeout in the communication system.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for detecting timeout for packets transmitted in a packet-switched point-to-point communication system, comprising:
 a master time counter;
 a first-in-first-out circuit (FIFO) having a data input terminal in communication with said master time counter and a data output terminal;
 difference logic in communication with said data output terminal and said master time counter;
 a timeout counter in communication with said difference logic; and
 timeout detection logic in communication with said timeout counter; wherein:
  said master time counter is configured to generate a time signal;
  said FIFO is configured to store time stamps for said packets in response to said time signal and to provide a time stamp to said difference logic in response to a packet acknowledgement;
  said difference logic comprises a first subtractor for subtracting said time stamp from said time signal generated by said master time counter to produce an elapsed time and a second subtractor for subtracting said elapsed time from a predefined timeout value to produce a time left value;
  each of said time stamps comprise N bits and said predefined timeout value comprises N−1 bits; and wherein said timeout detection logic is configured to produce a timeout signal in response a most significant bit of said time left value being set.

2. The apparatus of claim 1, wherein said timeout counter is configured count down from said time left value.

3. The apparatus of claim 2, wherein said timeout detection logic is configured to produce a timeout signal in response to said timeout counter reaching a zero value.

4. The apparatus of claim 3, wherein said FIFO is configured to flush all data stored therein in response to said timeout signal.

5. The apparatus of claim 1, wherein said FIFO includes a pop terminal and said timeout counter is configured to generate a zero signal, the apparatus further comprising combinatorial logic in communication with said pop terminal for controlling output of said FIFO in response to a packet acknowledgment signal and said zero signal.

6. The apparatus of claim 1, wherein said packet-switched point-to-point communication system is embedded in a field programmable gate array (FPGA), and wherein said FIFO comprises a block random access memory (BRAM).

7. A method of detecting timeout for packets transmitted in a packet-switched point-to-point communication system, comprising:
   obtaining a time stamp for a packet of said packets;
   computing a time left value for said packet based on said time stamp, a current time, and a predefined timeout value;
   loading a counter to count down from said time left value towards a zero value; and
   determining whether said counter has reached said zero value;
   reporting a timeout in response to said counter reaching said zero value; and
   reporting a timeout in response to a most significant bit of said time left value being set;
   wherein said step of computing comprises subtracting said time stamp from said current time to produce an elapsed time; and subtracting said elapsed time from said predefined timeout value to produce said time left value; and
   wherein said time stamp includes N bits and said predefined timeout value includes N−1 bits.

8. The method of claim 7, wherein said step of determining further comprises determining whether an acknowledgement has been received for said packet, and wherein the method further comprises:
   if said acknowledgment has been received:
      clearing said counter; and
      repeating said steps of obtaining, computing, loading, and reporting for another packet of said packets.

9. The method of claim 7, further comprising:
   storing time stamps in a first-in-first-out circuit (FIFO) associated with said packets;
   where said time stamp is obtained from said FIFO.

10. The method of claim 9, further comprising:
flushing said FIFO in response to said timeout.

* * * * *